J. A. SCHEUTZ.
FENDER.
APPLICATION FILED FEB. 21, 1918.
1,262,854.
Patented Apr. 16, 1918.
2 SHEETS—SHEET 2.
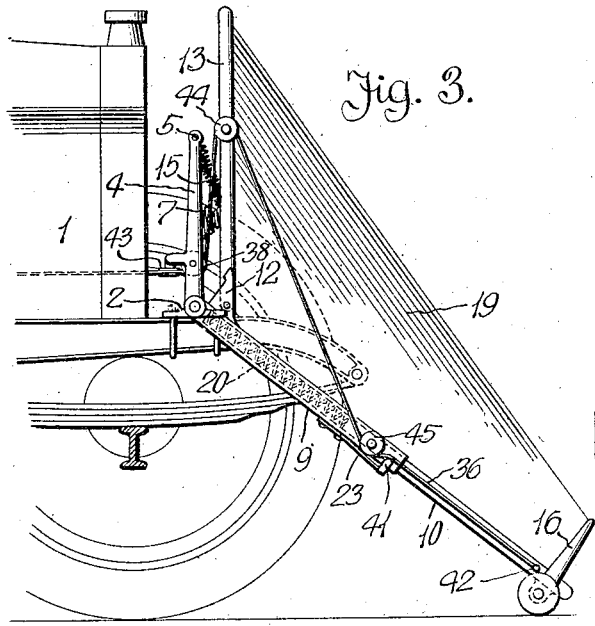
Fig. 3.
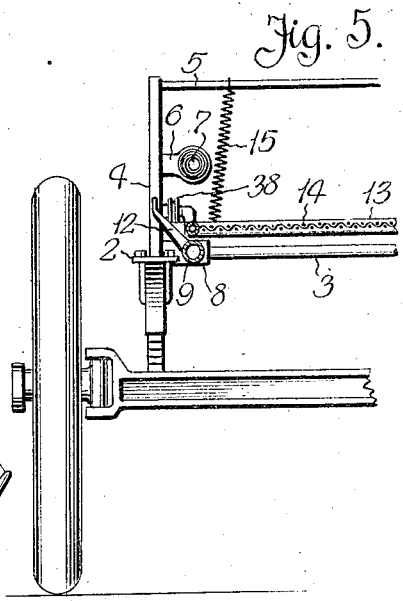
Fig. 5.
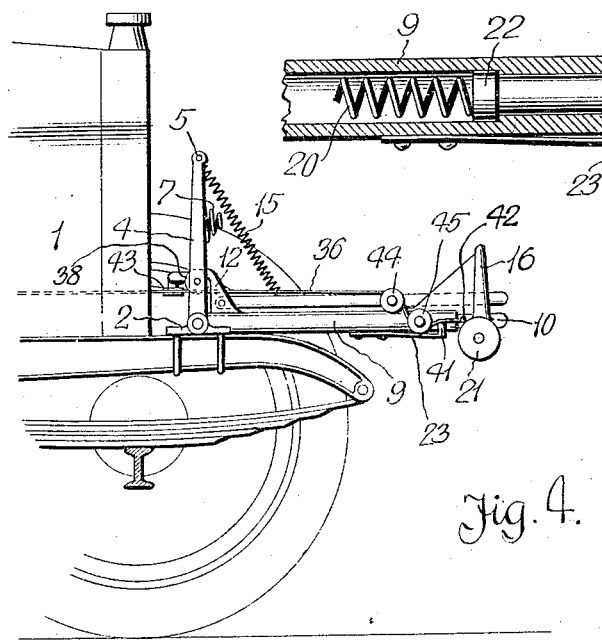
Fig. 4.
Fig. 6.
Witnesses
Chas. W. Stauffiger
Karl H. Butler
Inventor
Joseph A. Scheutz.
By
Attorneys

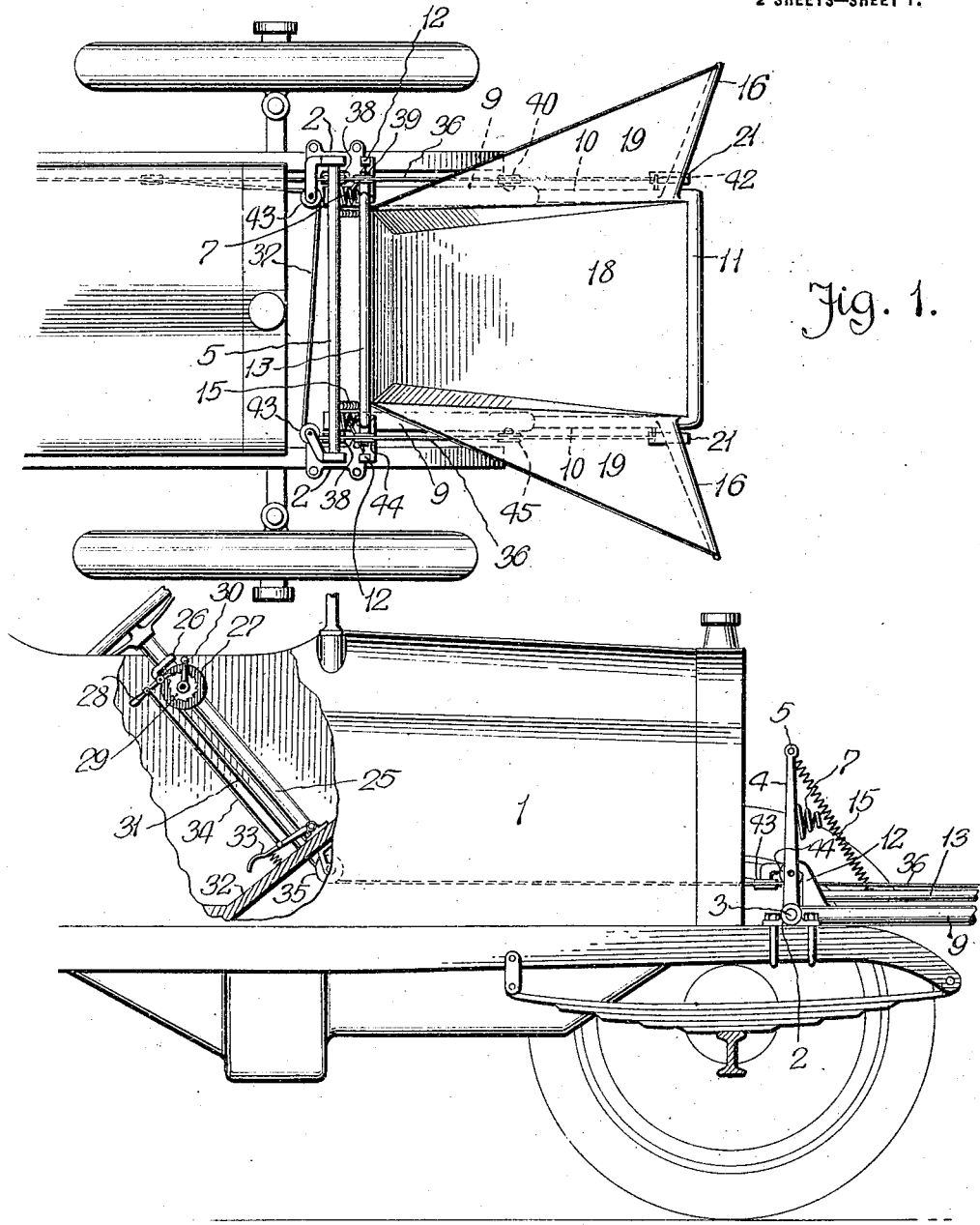

UNITED STATES PATENT OFFICE.

JOSEPH A. SCHEUTZ, OF DETROIT, MICHIGAN, ASSIGNOR OF ONE-HALF TO ROBERT W. LORKOWSKI, OF DETROIT, MICHIGAN.

FENDER.

1,262,854.  Specification of Letters Patent.  Patented Apr. 16, 1918.

Application filed February 21, 1918. Serial No. 218,429.

*To all whom it may concern:*

Be it known that I, JOSEPH A. SCHEUTZ, a citizen of the United States of America, residing at Detroit, in the county of Wayne and State of Michigan, have invented certain new and useful Improvements in Fenders, of which the following is a specification, reference being had therein to the accompanying drawing.

This invention relates to fenders, and the primary object of my invention is to provide a fender that may be advantageously used in connection with vehicles, as automobiles, to prevent pedestrians from being run down and injured by the fender carrying automobile, and while the fender will be hereinafter referred to in connection with an automobile, it will be noted that with slight modification it may be adapted for street cars and any vehicle having an operator.

Another object of my invention is to provide a fender which is normally collapsed on the front end of an automobile to occupy a comparatively small space and serve as a buffer, but may be extended or projected to the ground to form a scoop or receptacle for a person, animal or object with which the fender contacts.

A further object of my invention is to provide a normally collapsed fender which is automatically extended to an active position, and the operation of the fender may be controlled either by hand or foot.

The above and other objects are attained by a mechanical construction that will be hereinafter described and then claimed, and reference will now be had to the drawings, wherein—

Figure 1 is a plan of the fender in an active or extended position;

Fig. 2 is a side elevation of a portion of an automobile partly broken away and partly in section, showing a portion of the fender collapsed or in an inactive position, and the controlling mechanism of the fender;

Fig. 3 is a side elevation of the fender in an active or extended position;

Fig. 4 is a similar view of the fender in an inactive or collapsed position;

Fig. 5 is a cross sectional view of a portion of the fender, and

Fig. 6 shows detail sectional views of a portion of the fender, particularly a cable actuated latch.

In the drawings, 1 denotes, by the way of an example, a portion of a vehicle as an automobile, and connected to the forward ends of the side frame of the automobile or any other suitable support thereabout, are bearings 2 for a transverse rod 3. The bearings 2 are provided with uprights 4 connected by another transverse rod 5, and projecting inwardly from the uprights 4 are brackets 6 supporting cushion members 7, preferably in the form of springs.

Loose on the transverse rod 3, adjacent the bearings 2, are sleeves 8 provided with forwardly extending tubular arms 9, and slidable in said arms are extension arms 10. The extension arms 10 have the outer ends thereof connected by a transverse buffer bar 11 which coöperates with the arms 10 in providing a U shaped fender frame, slidable relative to the tubular arms 9. The rear ends of the tubular arms 9 are provided with stops 12 adapted to engage the uprights 4 and limit the upward movement of the arms 9. Pivotally mounted between the stops 12 is a frame 13 provided with a suitable net or flexible back piece 14. The frame 13 is connected by coiled retractile springs 15 to the transverse rod 5, and the retractile force of these springs is adapted to swing the frame 13 from a horizontal or inactive position to a vertical or active position, the former position being shown in Fig. 4, and the latter in Fig. 3, where it will be noted that the cushion members 7 are engaged by the frame 13, thus preventing the upward movement of the frame 13 from injuring that portion of the fender directly in the rear thereof.

The outer ends of the extension arms 10 are provided with angularly disposed supports 16 and these supports coöperate with the bar 11 and the frame 13 in supporting a flexible receptacle or fender body 18 having side wings 19. The receptacle may be made of netting, canvas or any flexible material that may be folded and said receptacle is adapted to receive a pedestrian, animal or object when struck by the fender.

In the tubular arms 9 are coiled expansion springs 20 and the expansive force of these springs is adapted to force the extension arms 10 outwardly, projecting the bar 11 toward the ground where it is supported in spaced relation thereto by wheels or rollers 21 at the outer ends of the extension arms 10. The inner ends of the extension arms 10 are provided with heads 22 in the tubular arms 9 to limit the outward movement of said extension arms, and said extension arms are adapted to be held when extended by latches 23 carried by the outer ends of the tubular arms 9. The latches 23 are in the form of flat springs connected to the arms 9 and provided with pins 24 adapted to extend into the extension arms 10.

On the steering column 25 of the automobile is a bracket 26 supporting a rotatable drum 27 and an operating lever 28. The rotatable drum 27 has a ratchet wheel 29 and a crank 30 by which a cable 31 is wound on the drum 27. The operating lever 28 has a pawl to engage the ratchet wheel 29 and thus maintain the cable 31 wound on said drum.

On the footboard or dash 32 of the automobile is a spring elevated treadle 33 connected by a rod 34 to the operating lever 28 and said operating lever or the treadle may be used for releasing the drum 27 so that the cable 31 may be unwound. The cable 31 extends through the dash or footboard 32 and under a rotatable sheave 35 carried thereby, said cable extending forwardly through the hood or engine cover of the automobile and provided with branches 36 and 37. The cable branch 36 extends under a sheave 38 carried by one of the uprights 4 upwardly over a sheave 39 at one side of the frame 13, downwardly under a sheave 40 at the outer end of one of the tubular arms 9 over a cable piece 41 of the latch 23, and is attached, as at 42, to the outer end of one of the extension arms 10. The cable branch 37 is trained over horizontal sheaves 43, carried by the uprights 4, over a sheave 44 on the frame 13 under a sheave 45 on the other tubular arm 9 and then attached to the outer end of the other of said extension arms 10, all very similar to the arrangement of the cable branch 36, so that these cable branches may coöperate in restoring the extended member to a collapsed form.

The normal or inactive position of the fender is shown in Fig. 4, where it will be observed that the frame 13 is held in a lowered position by the cable branches, with the springs 15 under tension. The frame 13 is parallel with the arms 9 and the body of the fender is folded between the arms and below the frame 13.

During the operation of the automobile, should the operator discover that a pedestrian or animal is about to be run over, the operator may release the drum 27 either through the medium of the operating lever 28 or the treadle 33. When the drum 27 is released the cable 31 is unwound by the expansive force of the springs 20 forcing the extension arms 10 outwardly. At the same time, the arms 9 are permitted to swing downwardly and the springs 15 elevate the frame 13, thus placing the entire fender in an active or extended position, as shown in Fig. 3.

When the cable is wound on the drum 27, the arms 9 are raised, the frame 13 lowered and the extension arms 10 drawn into the tubular arms 9.

One embodiment of my invention has been illustrated, but it is to be understood that the structural elements are susceptible to such changes as fall within the scope of the appended claims.

What I claim is:

1. A fender comprising pivoted tubular arms, a frame slidable in said arms, springs in said arms adapted to shift said frame outwardly relative to said arms, latches adapted to hold said frame in an extended position, a fender body connected to said frame, and cables connected to said frame and adapted to simultaneously retract said frame and release said latches.

2. A fender comprising pivoted tubular arms, a pivoted frame supported from said arms, a slidable frame movable relative to said arms, springs in said arms adapted for shifting said slidable frame to an active position, springs connected to said pivoted frame adapted for swinging said frame to an active position, a fender body supported by said arms and both of said frames, and means having connection with said arms and both of said frames for simultaneously shifting said arms and both of said frames to inactive positions.

3. A fender comprising normally horizontal arms and frames, one of said frames being pivoted relative to said arms and the other of said frames slidable relative thereto, cables maintaining said arms and said frames normally in an inactive position, means connected to the pivoted frame adapted to raise said frame to an active position, means engaging said slidable frame adapted to extend said frame to an active position, means connecting said cables to said arms and said frames, so that said arms and frames may be simultaneously shifted to an inactive position, and a flexible fender body supported by said arms and said frames and adapted to be folded between said frames when in an active position.

4. The combination with a vehicle, of brackets carried thereby, tubular arms supported from said brackets, a frame slidable in said arms, springs in said arms adapted to extend said frame relative to said arms, a pivoted frame between said arms, springs adapted to raise said pivoted frame from a horizontal position to a vertical position, a flexible fender body supported by both of said frames and said arms, sheaves carried by said arms and said pivoted frame, a cable having branches on said sheaves and connected to said slidable frame so that said frames and said arms may be simultaneously shifted to place said arms and frames in parallelism, and means adapted for holding said cable with said fender in an inactive position.

In testimony whereof I affix my signature in the presence of two witnesses.

JOSEPH A. SCHEUTZ.

Witnesses:
 KARL H. BUTLER,
 ANNA M. DORR.

Copies of this patent may be obtained for five cents each, by addressing the "Commissioner of Patents, Washington, D. C."